No. 653,112. Patented July 3, 1900.
T. H. NANCE.
GIN SAW CLEANER.
(Application filed Mar. 29, 1900.)
(No Model.)

Witnesses
Turner H. Nance Inventor
By his Attorneys,

UNITED STATES PATENT OFFICE.

TURNER HUNT NANCE, OF TALLADEGA, ALABAMA.

GIN-SAW CLEANER.

SPECIFICATION forming part of Letters Patent No. 653,112, dated July 3, 1900.

Application filed March 29, 1900. Serial No. 10,676. (No model.)

*To all whom it may concern:*

Be it known that I, TURNER HUNT NANCE, a citizen of the United States, residing at Talladega, in the county of Talladega and State of Alabama, have invented a new and useful Gin-Saw Cleaner, of which the following is a specification.

My invention is an improved gin-saw cleaner, one object of my invention being to provide an improved form of cleaning knife or plate which is adapted to be ground and sharpened repeatedly without materially reducing its width, and which is of maximum strength and efficiency.

A further object of my invention is to provide means whereby the cleaning knives or plates may yield in contact with a gin-saw tooth, and thereby avoid breaking the latter.

My invention consists of a gin-saw-cleaning knife comprising the plate having upturned blades with cutting edges on their upper sides.

My invention further consists in the combination, with a cleaning-knife, of a resilient support therefor, whereby the knife is adapted to yield in contact with a displaced gin-saw tooth.

Figure 1:
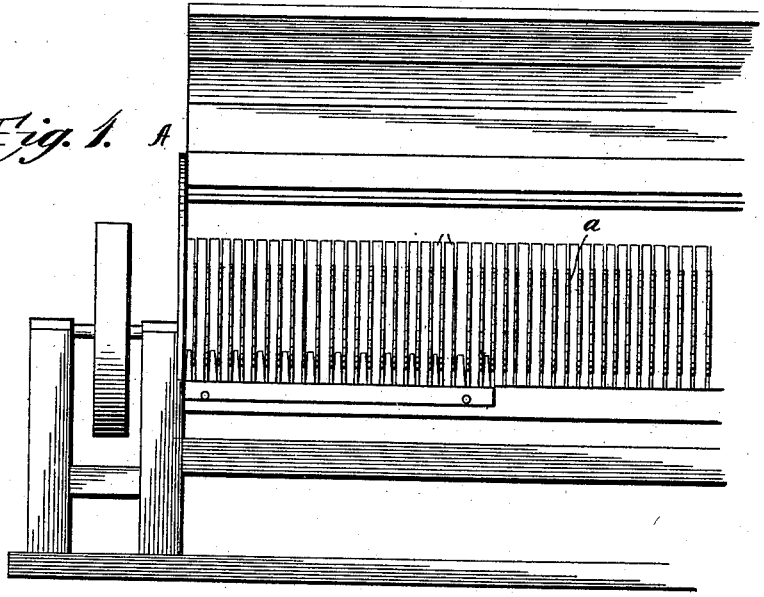
Figure 2:
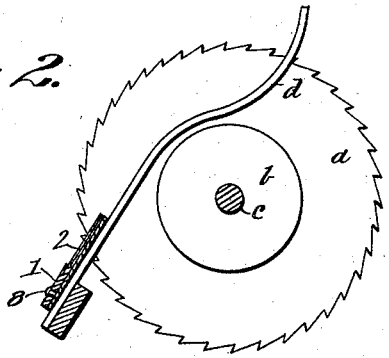
Figure 4:
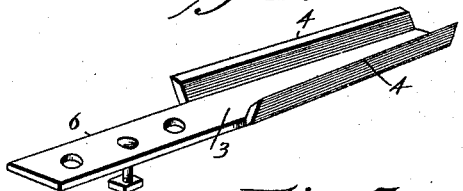
Figure 5:
Figure 3:
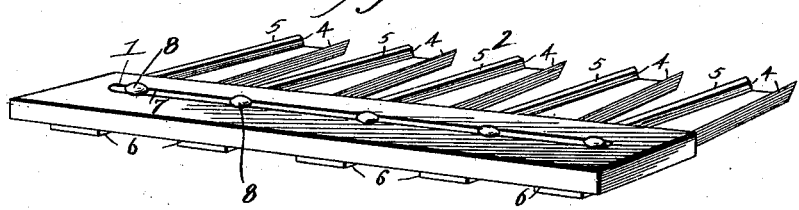

In the accompanying drawings, Figure 1 is a front elevation of a portion of a cotton-gin, showing a sectional gin-saw cleaner embodying my improvements in operative position thereon. Fig. 2 is a diagrammatic transverse section of the same on a larger scale. Fig. 3 is a perspective view of a section of a saw-cleaner embodying my improvements. Fig. 4 is a detail perspective view of one of the cleaning-knives. Fig. 5 is a detail transverse sectional view of the same.

For the purposes of this specification I have herein shown my improved gin-saw cleaner in operative arrangement on a cotton-gin A, the gin-saws being designated at *a*, the space-blocks between the gin-saws being designated at *b*, the saw-shaft at *c*, and the combs at *d*. In the embodiment of my invention for cleaning cotton from the gin-saws I provide a supporting-bar 1, which may be either coextensive in length with the width of the breast of the cotton-gin or of any appropriate length, and to the said supporting-bar I secure a series of any desired number of knives 2. I prefer to make the bar 1 of wood or other suitable resilient material for the purpose presently described, and each of my knives comprises a plate 3, which is adapted to be secured transversely on one side of the bar 1 and to project from the same, as shown. Formed integrally with the projecting portion of the plate 3 on the sides thereof are upturned blades or flanges 4, which are flared outwardly at a suitable angle from the plate 3 and converge toward the outer end of the plate and are provided on their upper sides with beveled cutting edges 5 at an appropriate angle, and which cutting edges are adapted to be ground and sharpened when the same becomes necessary. It will be observed by reference to the drawings, more particularly by reference to Figs. 4 and 5 thereof, that inasmuch as the upturned blades 4 project above the face of the plate 3 the cutting edges thereof may be repeatedly sharpened from time to time without materially reducing the width of the knife or impairing the efficient action thereof, thus greatly prolonging the life of the knife as compared with the cleaning-knives heretofore employed for this purpose. It will be further understood that the portion of the plate 3 which bears against and is secured to the bar 1 forms an elastic haft, and the bar 1 being resilient, as hereinbefore described, this construction of my improved gin-saw cleaner provides elastic supports for the cleaning-knives, whereby the latter are adapted to yield in contact with a displaced gin-saw tooth, and thereby avoid breaking the same from the saw.

In the operation of my invention the bar 1 is placed in position on the gin with the cleaning-knife disposed between the gin-saw and in contact therewith in the usual manner known to those skilled in this art, and by turning the gin-saws in the reverse direction to that in which they rotate when in operation the contacting edges of the cleaning-knives against the sides of the gin-saw effectually cut and remove the adhering cotton therefrom, thus entirely clearing the teeth of the gin-saws from the said adhering cotton.

My improved gin-saw-cleaning knives may be made of malleable iron or steel plate or of other suitable material, as may be preferred, and I do not limit myself in this particular.

To enable the cleaning-knives to be adjustably secured on the bar 1, I provide the latter with a longitudinal slot 7, through which bolts 8, which secure the hafts of the knives to the said bar, extend, as shown in Figs. 3 and 4.

Having thus described my invention, I claim—

1. A gin-saw-cleaning knife comprising a plate having upturned blades on the sides thereof, said blades having cutting edges on their upper sides, substantially as described.

2. A gin-saw-cleaning knife comprising a plate having outwardly-flared upturned blades on the sides thereof, substantially as described.

3. A gin-saw-cleaning knife comprising a plate having upturned blades on the sides thereof, said plate having an extended haft adapted to secure said knife to a suitable support, substantially as described.

4. A gin-saw-cleaning knife comprising a plate having upturned blades on the sides thereof, said plate having an elastic haft, for the purpose set forth, substantially as described.

In testimony that I claim the foregoing as my own I have hereto affixed my signature in the presence of two witnesses.

TURNER HUNT NANCE.

Witnesses:
S. W. MATSON,
W. H. BOYNTON.